United States Patent
Kim et al.

(10) Patent No.: US 9,614,749 B2
(45) Date of Patent: Apr. 4, 2017

(54) DATA PROCESSING SYSTEM AND METHOD FOR CHANGING A TRANSMISSION TABLE

(71) Applicant: Electronics and Telecommunications Research Institute, Daejeon (KR)

(72) Inventors: Bup Joong Kim, Daejeon (KR); Tae Kyu Kang, Daejeon (KR); Bheom Soon Joo, Daejeon (KR); Jong Hyun Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 158 days.

(21) Appl. No.: 14/613,565

(22) Filed: Feb. 4, 2015

(65) Prior Publication Data

US 2015/0229557 A1    Aug. 13, 2015

(30) Foreign Application Priority Data

Feb. 11, 2014    (KR) ......................... 10-2014-0015282

(51) Int. Cl.
*H04L 12/759* (2013.01)
*H04L 12/741* (2013.01)
*H04L 12/707* (2013.01)
*H04L 12/703* (2013.01)

(52) U.S. Cl.
CPC ............ *H04L 45/028* (2013.01); *H04L 45/22* (2013.01); *H04L 45/28* (2013.01); *H04L 45/745* (2013.01)

(58) Field of Classification Search
CPC ....... H04L 45/028; H04L 45/28; H04L 45/22; H04L 45/745
See application file for complete search history.

(56) References Cited

U.S. PATENT DOCUMENTS

| | | | |
|---|---|---|---|
| 7,590,048 B2 | 9/2009 | Doukai | |
| 7,590,054 B1 | 9/2009 | Holness et al. | |
| 7,986,618 B2 | 7/2011 | Charny et al. | |
| 2005/0141417 A1 | 6/2005 | Huang et al. | |
| 2011/0286324 A1 | 11/2011 | Bellagamba et al. | |
| 2013/0054763 A1* | 2/2013 | Van Der Merwe | H04W 8/12 709/220 |
| 2014/0244746 A1* | 8/2014 | Ross | H04L 45/02 709/204 |
| 2016/0218957 A1* | 7/2016 | Liang | H04L 45/64 |

* cited by examiner

*Primary Examiner* — Omar Ghowrwal
(74) *Attorney, Agent, or Firm* — William Park & Associates Ltd.

(57) ABSTRACT

Provided is a data processing system, including: a plurality of line matching blocks each including a data processor configured to store predefined preliminary transmission tables corresponding to the respective events requiring change of a data path, to determine whether to change a transmission table based on information received through an internal communication device, and to select and activate a preliminary transmission table corresponding to an event from among the preliminary transmission tables, wherein the preliminary transmission tables include destination information on all the physical or logical paths; and a shared bus configured to enable information on an event requiring change of the data path to be transmitted and received between the plurality of line matching blocks.

17 Claims, 8 Drawing Sheets

FIG. 7

DATA PROCESSING SYSTEM AND METHOD FOR CHANGING A TRANSMISSION TABLE

CROSS-REFERENCE TO RELATED APPLICATION

This application claims the priority benefit of Korean Patent Application No. 10-2014-0015282, filed on Feb. 11, 2014, in the Korean Intellectual Property Office, the disclosure of which is incorporated herein by reference.

BACKGROUND

1. Field of the Invention

Embodiments of the present invention relate to a data processing system for changing a large number of paths time-deterministically and an operating method of the data processing system.

2. Description of the Related Art

When relaying a packet on a network, Internet protocol (IP)-based lookup uses large processing resources and memory resources. Accordingly, instead of employing the IP-based lookup, a multi-protocol label switching (MPLS) technology capable of performing packet switching has been widely employed. Attempts to further simplify the MPLS technology and to apply the simplified MPLS technology to a data transmission network such as a line technology-based backhaul network have been made from various angles. As a result, there is a technology such as a technology in which an MPLS-transport profile (TP) technology and Ethernet are combined, and a data packet switching technology to which the MPLS-TP technology is partially modified and thereby applied.

In addition, there is an increasing demand for a data packet transmission network technology capable of performing a packet transmission with low cost and low energy while accommodating the capability of providing a deterministic transmission service, the capability of coping with a line malfunction, and the line management capability in an existing line network. Accordingly, attempts to apply, to transmission equipment and a transmission network, the MPLS-TP technology in which the recovery capability and the management capability of a setting path are added to the simplified transmission technology of MPLS are actively conducted.

Packet relay uses a simple packet switching method and thus, may readily achieve a large data transmission technology. However, since the packet relay is based on a packet, it may be difficult to achieve a deterministic path service and the path management and recovery capabilities. Also, as large data transmission is enabled, a single transmission pipe may accommodate a large number of line paths. Accordingly, although line path service costs may be reduced, costs and difficulty for achieving line path recovery and management functions, which have been provided in a line network, may increase.

SUMMARY

An aspect of the present invention provides a system and method that enables packet-based data processing equipment to change, with a substitute path, a path in which an event requiring a path change has occurred, in response to an occurrence of the event in a data port in which a plurality of physical or logical paths is included, a line matching block, or a logical path group.

According to an aspect of the present invention, there is provided a data processing system, including: a plurality of line matching blocks each including a data processor configured to store predefined preliminary transmission tables corresponding to the respective events requiring change of a data path, to determine whether to change a transmission table based on information received through an internal communication device, and to select and activate a preliminary transmission table corresponding to an event from among the preliminary transmission tables, wherein the preliminary transmission tables include destination information on all the physical or logical paths; and a shared bus configured to enable information on an event requiring change of the data path to be transmitted and received between the plurality of line matching blocks.

The data processor may verify an occurrence of the event by collecting state information of the line matching blocks, and may simultaneously notify at least a portion of the line matching blocks about the occurrence of the event through the internal communication device in response to the occurrence of the event.

The data processor may include: a bus controller configured to create a message including the occurrence of the event in response to the occurrence of the event, and to transfer the message to remaining line matching blocks excluding a line matching block in which the event has occurred, through the shared bus; a bus matching port configured to convert a transmission or reception message of the bus controller to a physical message format of the shared bus; a data processing engine memory configured to store the preliminary transmission tables that are defined for the respective events; and a data processing engine configured to find an output data port corresponding to an input path of input data coming through a data port by referring to the preliminary transmission tables stored in the data processing engine memory.

When the message is received, the bus controller may interpret the message, may determine whether to change the transmission table, and may use the selected preliminary transmission table as an active transmission table based on the determination result.

The bus controller may use the selected preliminary transmission table as the active transmission table by duplicating content of the selected preliminary transmission table at a location of the active transmission table.

The bus controller may use the selected preliminary transmission table as the active transmission table by changing a base address of the active transmission table with a base address of the selected preliminary transmission table.

The bus controller may use the selected preliminary transmission table as the active transmission table by locating the active transmission table on a virtual space, and by mapping a physical address of the selected preliminary transmission table at a location of the active transmission table on the virtual space.

The data processing system may further include a bus controller memory configured to store the predefined preliminary transmission tables. The bus controller may include: a transmission table designator configured to designate an identifier (ID) of a preliminary transmission table corresponding to the event; and a path change interpreter configured to interpret a message transmitted and received between the line matching blocks through the bus matching port, to recognize the event requiring change of the data path, and to input, to the transmission table designator, the ID of the preliminary transmission table corresponding to the event.

The preliminary transmission table selected by the transmission table designator may be used as an active transmission table for the data processing engine.

The bus controller may include a path change interpreter configured to interpret a message transmitted and received between the line matching blocks through the bus matching port, to recognize the event requiring change of the data path, and to input, to the transmission table designator, an ID of the preliminary transmission table corresponding to the event. The data processing engine may include: a transmission table designator configured to designate the ID of the preliminary transmission table corresponding to the event; and a data processing engine memory configured to store the predefined preliminary transmission tables.

The event requiring change of the data path may occur in at least one of data ports in which a plurality of physical paths or a plurality of logical paths is included, the line matching blocks, and logical path groups.

The data processing system may further include a system control block including a system controller configured to verify an occurrence of the event by collecting state information of the line matching blocks, and to notify at least a portion of the line matching blocks about the occurrence of the event through the internal communication device in response to the occurrence of the event.

The system controller may include: a bus controller configured to create a message including the occurrence of the event in response to the occurrence of the event, and to transfer the message to remaining line matching blocks excluding at least a portion of the line matching blocks through the shared bus; and a bus matching port configured to convert a transmission or reception message of the bus controller to a physical message format of the shared bus.

The shared bus may include at least one of a data path configured as a data switch for relaying exchange of user data between the line matching blocks and a switch port and a control path for messaging between processors.

A bus controller and a bus matching port included in each of the line matching blocks may operate as a bus node of the shared bus. The shared bus may be provided in a multi-bus structure in which a master bus node at which a predetermined block, among the line matching blocks, performs a master function is present for each line matching block and the master bus node collectively transfers a common message to the entire slave bus nodes or a predetermined group.

According to another aspect of the present invention, there is provided an operating method of a data processing system, the method including: storing predefined preliminary transmission tables corresponding to the respective events requiring change of a data path, wherein the preliminary transmission tables include destination information on all the physical or logical paths; simultaneously notifying a plurality of line matching blocks about an occurrence of an event through an internal communication device in response to the occurrence of the event; determining whether to change a transmission table in response to the occurrence of the event; and selecting and activating a preliminary transmission table corresponding to the event from among the preliminary transmission tables based on the determination result.

The operating method of the data processing system may further include finding an output data port corresponding to an input path of input data coming through a data port by referring to the preliminary transmission tables.

The operating method of the data processing system may further include recognizing the event by interpreting a message transmitted and received between the line matching blocks through a bus matching port.

The selecting and the activating may include inputting, to a transmission table designator, an ID of the preliminary transmission table corresponding to the event.

The selecting and the activating may include duplicating content of a preliminary transmission table selected from among the preliminary transmission tables at a location of an active transmission table.

Effect

According to embodiments of the present invention, packet-based data processing equipment may change, with a substitute path, a path in which an event requiring a path change has occurred, in response to an occurrence of the event in a data port in which a plurality of physical or logical paths is included, a line matching block, or a logical path group.

BRIEF DESCRIPTION OF THE DRAWINGS

These and/or other aspects, features, and advantages of the invention will become apparent and more readily appreciated from the following description of embodiments, taken in conjunction with the accompanying drawings of which.

DETAILED DESCRIPTION

Reference will now be made in detail to embodiments of the present invention, examples of which are illustrated in the accompanying drawings, wherein like reference numerals refer to the like elements throughout. Embodiments are described below to explain the present invention by referring to the figures.

When an error occurs in a physical or virtual link, a port, or a block in which a large number of physical or logical line paths are included, data processing equipment may need to simultaneously change active paths passing by the corresponding link, port, or block, with substitute line paths. Here, all the paths of the data processing equipment are defined in a transmission table. For a seamless data service, an error occurring in a physical or logical path needs to be recognized and handled during a fixed short period of time. Due to an error occurring in the physical or logical path, a corresponding path needs to be changed. To this end, an entry corresponding to the path in which the error has occurred needs to be found from a transmission table and content thereof needs to be updated.

When data processing equipment relays data using a single data processing engine, modification may be relatively simply performed since updating of a transmission table is limited to a transmission table of the single data processing engine. When the data processing equipment uses a plurality of data processing engines, updating of a transmission table for path change is associated with transmission tables of all the data processing engines and thus, a processing complete time is long and a processing process is also complex.

When an error occurs in data ports in which a plurality of logical paths is included and line matching blocks, all the related paths need to be changed with substitute paths. Here, if a transmission table is changed by exchanging information with respect to each path to be substituted, an amount of time used to update all the transmission tables within the data processing equipment may increase to be proportional to the number of paths to be substituted.

Accordingly, provided is a structure of a data processing system that enables data processing equipment to time-deterministically cope with an occurrence of an error in a physical or virtual link, a port, and a line matching block requiring a large scale path change, and an operating method of the data processing system.

Figure 1:
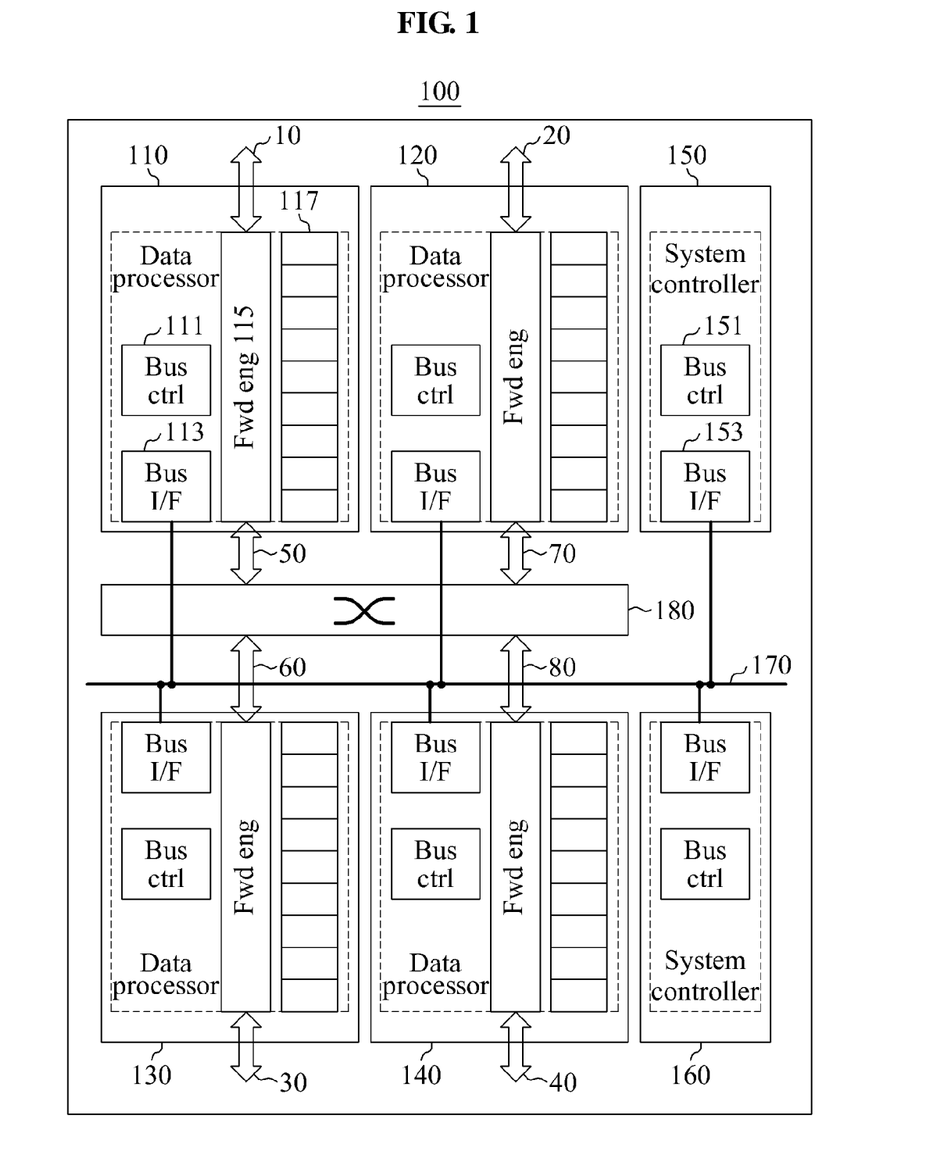
FIG. 1 illustrates a structure of a data processing system according to an embodiment.

FIG. 1 illustrates a structure of a data processing system 100 according to an embodiment.

Referring to FIG. 1, the data processing system 100 may include a plurality of line matching blocks 110, 120, 130, and 140, each including a data processor, system control blocks 150 and 160, each including a system controller, and a shared bus 170.

The data processor may store predefined preliminary transmission tables corresponding to the respective events requiring change of a data path. The preliminary transmission tables may include destination information on all the physical or logical paths. The data processor may determine whether to change a transmission table based on information received through an internal communication device, and may select and activate a preliminary transmission table corresponding to an event from among the preliminary transmission tables. Also, the data processor may verify an occurrence of the event by collecting state information of the line matching blocks 110, 120, 130, and 140, and may simultaneously notify at least a portion of the line matching blocks 110, 120, 130, and 140 about the occurrence of the event through the internal communication device in response to the occurrence of the event.

When the above operation is not performed in the line matching blocks 110, 120, 130, and 140 each including the data processor, the system control blocks 150 and 160 each including the system controller may verify the occurrence of the event by collecting state information of the line matching blocks 110, 120, 130, and 140, and may simultaneously notify at least a portion of the line matching blocks 110, 120, 130, and 140 about the occurrence of the event through the internal communication device in response to the occurrence of the event.

A block configured to periodically verify malfunctioning of a predetermined line matching block and to notify another line matching block about an occurrence of an error when there is no response or when the error occurs in the entire line matching blocks may be referred to as a management block. The management block may be any one of a line matching block and a system control block. For example, when an error occurs in the entire line matching blocks, the system control block may function as the management block.

In general, when there is a need to change a destination of a predetermined physical or logical path, destination information may be changed by finding an entry of a corresponding path from a transmission table. For a seamless data service, an error occurring in a logical path needs to be recognized and handled during a fixed short period of time. Due to an error occurring in the physical or logical path, a corresponding path needs to be changed. To this end, an entry corresponding to the path in which the malfunction has occurred may be found from a transmission table and content thereof may be updated.

For example, when the data processing system 100 relays data using only a single data processing engine, modification may be relatively simply performed since only a transmission table of the single data processing engine needs to be updated. On the contrary, when the data processing system 100 relays data using a plurality of data processing engines, transmission tables of all the data processing engines need to be updated for path change and thus, a processing complete time is long and a processing process is also complex.

When an error occurs in data ports 10, 20, 30, and 40 in which a plurality of logical paths is included or the line matching blocks 110, 120, 130, and 140, all the related paths need to be changed with substitute paths. In this case, if content of a transmission table is changed every time by exchanging information on a substitute path, an amount of time used to update all the transmission tables included in the data processing system 100 may increase to be proportional to the number of paths to be substituted.

Also, when an error occurs in the data ports 10, 20, 30, and 40 or the line matching blocks 110, 120, 130, and 140, content of a transmission table of which destination is a corresponding data port or line matching block needs to be modified.

A plurality of logical ports and paths may be included in physical data ports, for example, the data ports 10, 20, 30, and 40. The plurality of data ports 10, 20, 30, and 40 may be included in the line matching blocks 110, 120, 130, and 140, respectively. Accordingly, when an error occurs in the data ports 10, 20, 30, and 40 or the line matching blocks 110, 120, 130, and 140, destination paths of transmission tables of which destinations are corresponding data ports or line matching blocks need to be changed with substitute paths.

When information associated with change of a corresponding path is to be exchanged with respect to each of all the logical paths of which destinations are corresponding data ports and line matching blocks, an amount of data may temporarily exponentially increase in a control message channel of the data processing system 100. Although each of the line matching blocks 110, 120, 130, and 140 uses a large amount of time to update a transmission table, it may be difficult to predict an amount of time used to change all the corresponding paths with substitute paths.

According to an embodiment, when an event requiring change of a data path occurs in data ports, line matching blocks, and a predetermined logical path group, preliminary transmission tables capable of coping with the respective events may be predefined in memories of bus controllers of the line matching blocks and a data processing engine memory of a data processing engine 115.

In response to an occurrence of an event, a large number of paths may be simultaneously changed with substitute paths by exchanging event information between the line matching blocks 110, 120, 130, and 140, or between the line matching blocks 110, 120, 130, and 140 and the system control blocks 150 and 160 through the shared bus 170.

Hereinafter, a configuration of a data processor according to an embodiment will be described.

Referring to FIG. 1, the data processor may include a bus controller 111, a bus matching port 113, a data processing engine 115, and a data processing engine memory 117.

In response to an occurrence of an event, the bus controller 111 having recognized the occurrence of the event requiring change of a data path may transfer a message including the occurrence of the event to bus controllers of remaining line matching blocks excluding a line matching block in which the event has occurred, through the shared bus 170 using a multicast method or a broadcast method. A bus controller of another line matching block that receives the message may select a preliminary transmission table corresponding to the event and may use the selected preliminary transmission table as an active transmission table.

In response to a message including an occurrence of an event received from another line matching block, the bus controller 111 may interpret the message, may determine whether to change the transmission table, and may use the selected preliminary transmission table as an active transmission table based on the determination result. Here, the active transmission table refers to a preliminary transmission table that is selected from among preliminary transmission tables in response to the event requiring change of the data path and used for a data processing engine. That is, the active transmission table refers to a preliminary transmission table that substitutes a transmission table indicating an existing path in which an error has occurred, when the error occurs in a data port in which a plurality of physical and a plurality of logical paths is included, a line matching block, or a logical path group.

A method of using, by the bus controller 111, a preliminary transmission table as an active transmission table will be described with reference to FIG. 6.

According to an embodiment, an event requiring change of a data path may occur during an initial setup or an operation of a data processing system, or may occur even in an initial setup of a new line matching block, data port, or predetermined logical path group. Here, a preliminary transmission table corresponding to each event may be preset in a memory of a bus controller, for example, bus controllers 111 and 151, or a data processing engine memory.

A structure of a data processor and a method of changing, by a bus controller of the data processor, a preliminary transmission table with an active transmission table will be described with reference to FIGS. 4 and 5.

Referring again to FIG. 1, the bus matching port 113 may convert a transmission or reception message of the bus controller 111 to a physical message format of the shared bus 170.

The data processing engine 115 may find an output data port corresponding to an input path of input data coming through the data port 10 by referring to preliminary transmission tables stored in the data processing engine memory 117.

The data processing engine memory 117 may store the preliminary transmission tables. Here, the preliminary transmission tables are defined for the respective events and may be stored for the respective events in the data processing engine memory 117.

The system controller included in each of the system control blocks 150 and 160 may verify an occurrence of the event by collecting state information of the line matching blocks 110, 120, 130, and 140, and may simultaneously notify at least a portion of the line matching blocks 110, 120, 130, and 140 about the occurrence of the event through the internal communication device in response to the occurrence of the event.

The system controller may include a bus controller 151 and a bus matching port 153.

In response to an occurrence of an event requiring change of a data path, the bus controller 151 may create a message including the occurrence of the event, and may transfer the message to bus controllers of remaining line matching blocks through the shared bus 170.

The bus matching port 153 may convert a transmission or reception message of the bus controller 151 to a physical message format of the shared bus 170.

The shared bus 170 in a bus form may be used to exchange information on the event when the event occurs.

The shared bus 170 may be an example of the internal communication device and may be used to exchange path information associated with an event requiring change of a data path between the line matching blocks 110, 120, 130, and 140.

The shared bus 170 may include at least one of a data path configured as a data switch 180 for relaying exchange of user data between the line matching blocks 110, 120, 130, and 140, and switch ports 50, 60, 70, and 80 and a control path for messaging between processors (not shown). Here, the data path and the control path may be separately present and may be present in a mixed form.

The line matching blocks 110, 120, 130, and 140 and the system blocks 150 and 160 may be connected to the shared bus 170 through the bus matching ports 113 and 153.

The line matching blocks 110, 120, 130, and 140 may mutually exchange data through relay of the data switch 180.

The shared bus 170 may be an example of the internal communication device and may operate in a common bus structure or in a multi-bus structure. A case in which the shared bus 170 operates in the common bus structure will be described with reference to FIG. 2, and a case in which the shared bus 170 operates in the multi-bus structure will be described with reference to FIG. 3.

The bus controller 111 and the bus matching port 113 included in each of the line matching blocks 110, 120, 130, and 140 may operate as bus nodes of the shared bus 170.

Figure 2:
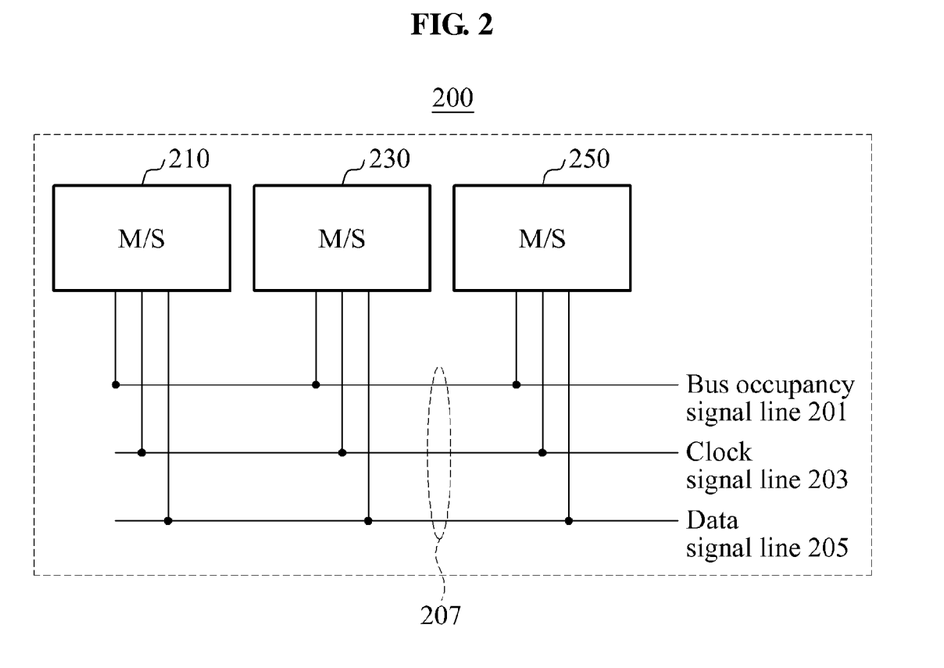
FIG. 2 is a diagram describing a case in which a shared bus corresponding to an example of an internal communication device is provided in a common bus structure according to an embodiment.

FIG. 2 is a diagram describing a case in which a shared bus 207 corresponding to an example of an internal communication device is provided in a common bus structure 200 according to an embodiment.

Referring to FIG. 2, the common bus structure 200 may include bus nodes 210, 230, and 250, a bus occupancy signal line 201, a clock signal line 203, and a data signal line 205.

In the common bus structure 200, each of the bus nodes 210, 230, and 250 may perform functionalities of both a master bus node and a slave bus node.

The bus controllers 111 and 151 and the bus matching ports 113 and 153 of the line matching blocks 110, 120, 130, and 140 and the system control blocks 150 and 160 of FIG. 1 may operate as the bus nodes 210, 230, and 250.

Through the shared bush 207, the master bus node may transmit an event requiring change of a path to the slave bus node or request the slave bus node for a state of a block, for example, a line matching block or a system control block in which a bus node is included, or may transmit path information to the salve bus node or request the salve bus node for path information.

A predetermined bus node that is to occupy the shared bus 207 may verify the bus occupancy signal line 201. When the bus occupancy signal is inactivated, the predetermined bus node may activate a bus occupancy signal and may request other bus nodes to export or read data.

The clock signal line 203 may be used to exchange synchronized timing information or clock signal when transmitting and receiving data among the bus nodes 210, 230, and 250.

The data signal line 205 may be used to exchange actual data based on a timing of a clock signal using the clock signal line 203.

Figure 3:
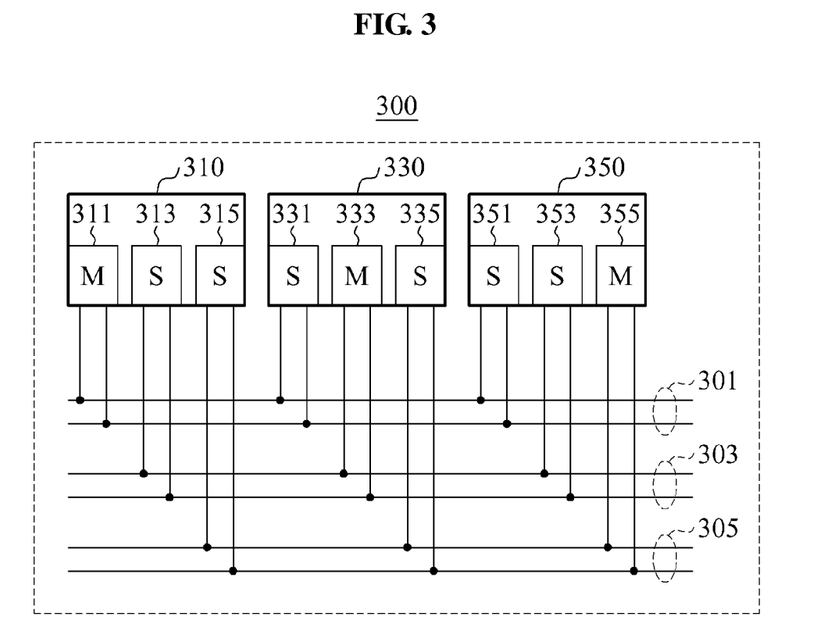
FIG. 3 is a diagram describing a case in which a shared bus corresponding to an example of an internal communication device is provided in a multi-bus structure according to an embodiment.

FIG. 3 is a diagram describing a case in which a shared bus corresponding to an example of an internal communication device is provided in a multi-bus structure 300 according to an embodiment.

Referring to FIG. 3, in the multi-bus structure 300, a master bus node at which among line matching blocks and system blocks, only a predetermined block, for example, a line matching block in which an event requiring change of a data path has occurred performs a maser function is present for each block.

In the multi-bus structure 300, an exclusive shared bus is present for each block and thus, information associated with an event requiring change of a path may be further quickly and stably shared between blocks.

Also, in the multi-bus structure 300, the master bus node may collectively transfer a common message to the entire slave bus nodes or a predetermined group.

The bus controllers 111 and 151 and the bus matching ports 113 and 153 of the line matching blocks 110, 120, 130, and 140 and the system control blocks 150 and 160 of FIG. 1 may operate as bus nodes 310, 330, and 350.

In the multi-bus structure 300, each of master owned channels 301, 303, and 305 may be connected to master ports 311, 333, and 355 or slave ports 313, 315, 331, 335, 351, and 353 of the bus nodes 310, 330, and 350.

A predetermined bus node may access a master owned channel, for example, the master owned channels 301, 303, and 305, of the bus node through a master port, for example, the master ports 311, 333, and 355, to transmit data to another bus node or request another bus node for data, and may receive data from a maser bus node or respond to a data request through a slave port, for example, the slave ports 313, 315, 331, 335, 351, and 353.

Figure 4:
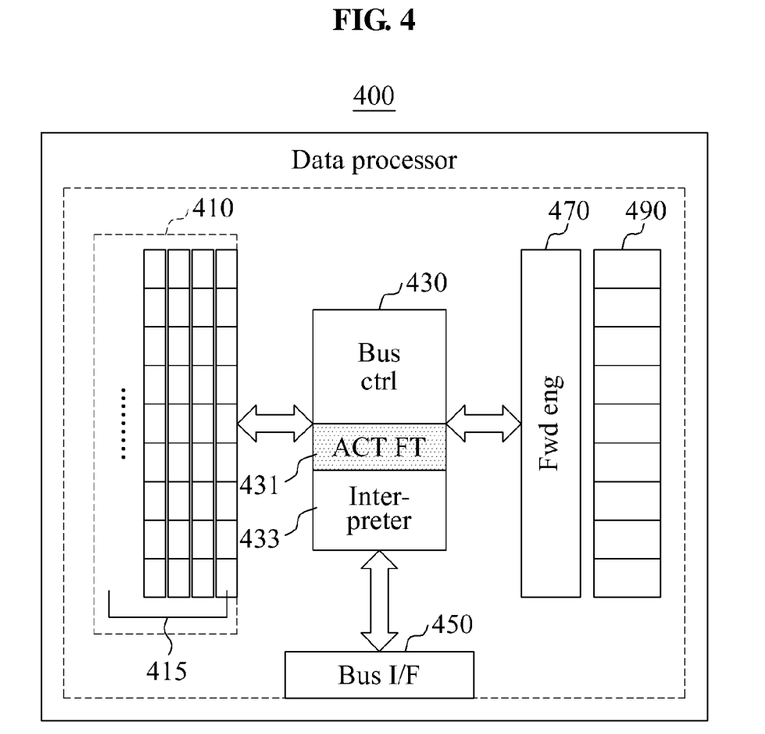
FIG. 4 illustrates a structure of a data processor according to an embodiment.

FIG. 4 illustrates a structure of a data processor 400 according to an embodiment.

A structure of the data processor 400 and a method of using, by the data processor 400, a preliminary transmission table as an active transmission table will be described with reference to FIG. 4.

Referring to FIG. 4, the data processor 400 may include a bus controller memory 410, a bus controller 430, a bus matching port 450, a data processing engine 470, and a data processing engine memory 490.

The bus controller memory 410 may store predefined preliminary transmission tables The bus controller 430 may include a transmission table designator 431 and a path change interpreter 433.

The transmission table designator 431 may designate an identifier (ID) of a preliminary transmission table corresponding to an event.

The path change interpreter 433 may interpret a message transmitted and received between line matching blocks through the bus matching port 450, and may recognize the event requiring change of the data path. Also, the path change interpreter 433 may input, to the transmission table designator 431, the ID of the preliminary transmission table corresponding to the event. The preliminary transmission table selected by the transmission table designator 431 may be used as an active transmission table for the data processing engine 470.

The bus matching port 450 may convert a transmission or reception message of the bus controller 430 to a physical message format of a shared bus (not shown).

The data processing engine 470 may find an output data port corresponding to an input path of input data coming through a data port by referring to the preliminary transmission tables stored in the data processing engine memory 490.

A transmission table may be defined in the bus controller memory 410 for each event. An occurrence of an event requiring change of a transmission table may be shared between blocks through the shared bus.

In response to the occurrence of the event requiring change of the transmission table, the bus controller 430 may input, to the transmission table designator 431, an ID of the transmission table corresponding to the event, and may update the transmission table of the data processing engine 470 with a new transmission table.

A preliminary transmission table 415 of the bus controller memory 410 designated by the transmission table designator 431 may be used as an active transmission table of the data processing engine 470.

The preliminary transmission table 415 selected by the transmission table designator 431 from among the preliminary transmission tables stored in the bus controller memory 410 may be duplicated to the data processing engine memory 490 of the data processing engine 470, or may be used as the active transmission table of the data processing engine 470 on the bus controller memory 410 through memory sharing of the bus controller 430.

Figure 5:
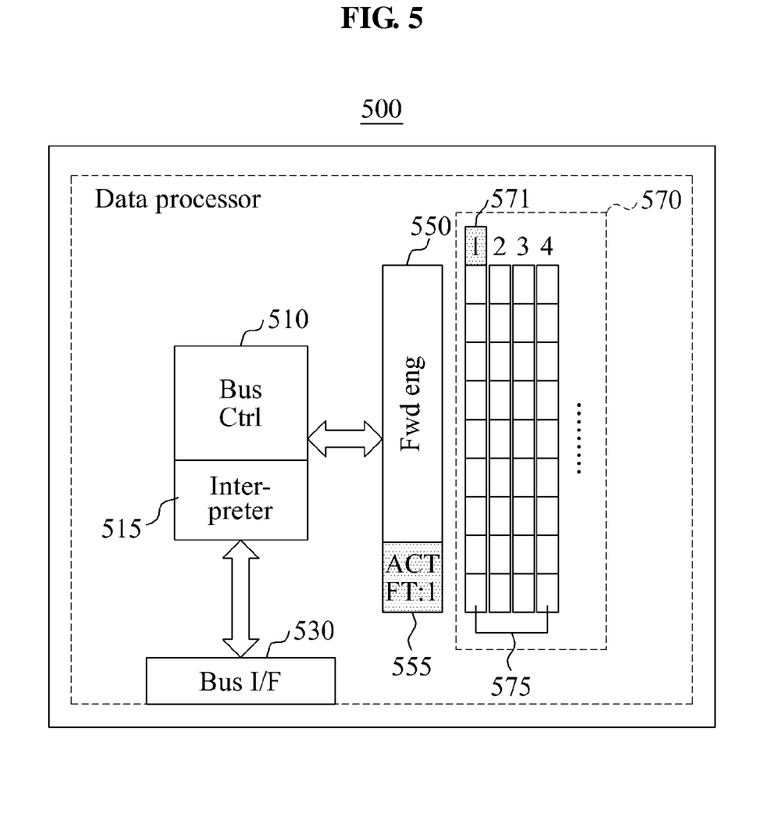
FIG. 5 illustrates a structure of a data processor according to another embodiment.

FIG. 5 illustrates a structure of a data processor 500 according to another embodiment.

A structure of the data processor 500 and a method of using, by the data processor 500, a preliminary transmission table as an active transmission table will be described with reference to FIG. 5.

Referring to FIG. 5, the data processor 500 may include a bus controller 510, a bus matching port 530, a data processing engine 550, and a data processing engine memory 570.

The bus controller 510 may include a path change interpreter 515.

The path change interpreter 515 may interpret a message transmitted and received between line matching blocks through the bus matching port 530, may recognize an event requiring change of a data path, and may input, to a transmission table designator 555, an ID of a preliminary transmission table corresponding to the recognized event The data processing engine 550 may include the transmission table designator 555 configured to designate the ID of the preliminary transmission table corresponding to the event and the data processing engine memory 570 configured to store predefined preliminary transmission tables.

A transmission table may be defined in the data processing engine memory 570 for each event and an occurrence of an event requiring change of a transmission table may be shared between blocks through a shared bus (not shown).

In response to the occurrence of the event requiring change of the transmission table, the bus controller 510 enables the data processing engine 550 to use a new transmission table by inputting an ID of the transmission table corresponding to the event to the transmission table designator 555.

Among preliminary transmission tables 575 defined in the data processing engine memory 570, a preliminary transmission table designated by the transmission table designator 555 may be used as an active transmission table 571 of the data processing engine 550.

Figure 6:
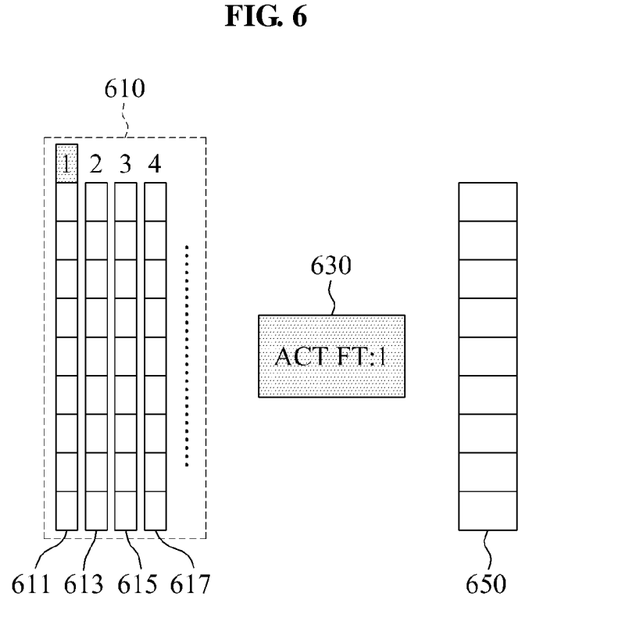
FIG. 6 illustrates an example of defining a transmission table for each event requiring change of a data path and using the transmission table for path change according to an embodiment.

FIG. 6 illustrates an example of defining a transmission table for each event requiring change of a data path and using the transmission table for path change according to an embodiment.

Referring to FIG. 6, preliminary transmission tables 611, 613, 615, and 617 are defined in a data processing engine memory 610 for the respective events.

When a change of a transmission table is required in response to an occurrence of an event requiring change of a data path, a bus controller enables a data processing engine to use a new transmission table by inputting an ID of a transmission table corresponding to the event to a transmission table designator 630.

A preliminary transmission table selected from among the preliminary transmission tables 611, 613, 615, and 617 based on the ID of the transmission table input to the transmission table designator 630 may be used as an active transmission table 650 using the following methods.

The bus controller may use the selected preliminary transmission table as the active transmission table 650 by duplicating content of the selected preliminary transmission table at a location of the active transmission table 650 or by changing a base address of the active transmission table 650 with a base address of the selected preliminary transmission table.

In addition, the bus controller may use the selected preliminary transmission table as the active transmission table 650 by locating the active transmission table 650 on a virtual space, and by mapping a physical address of the selected preliminary transmission table at a location of the active transmission table 650 on the virtual space.

Figure 7:
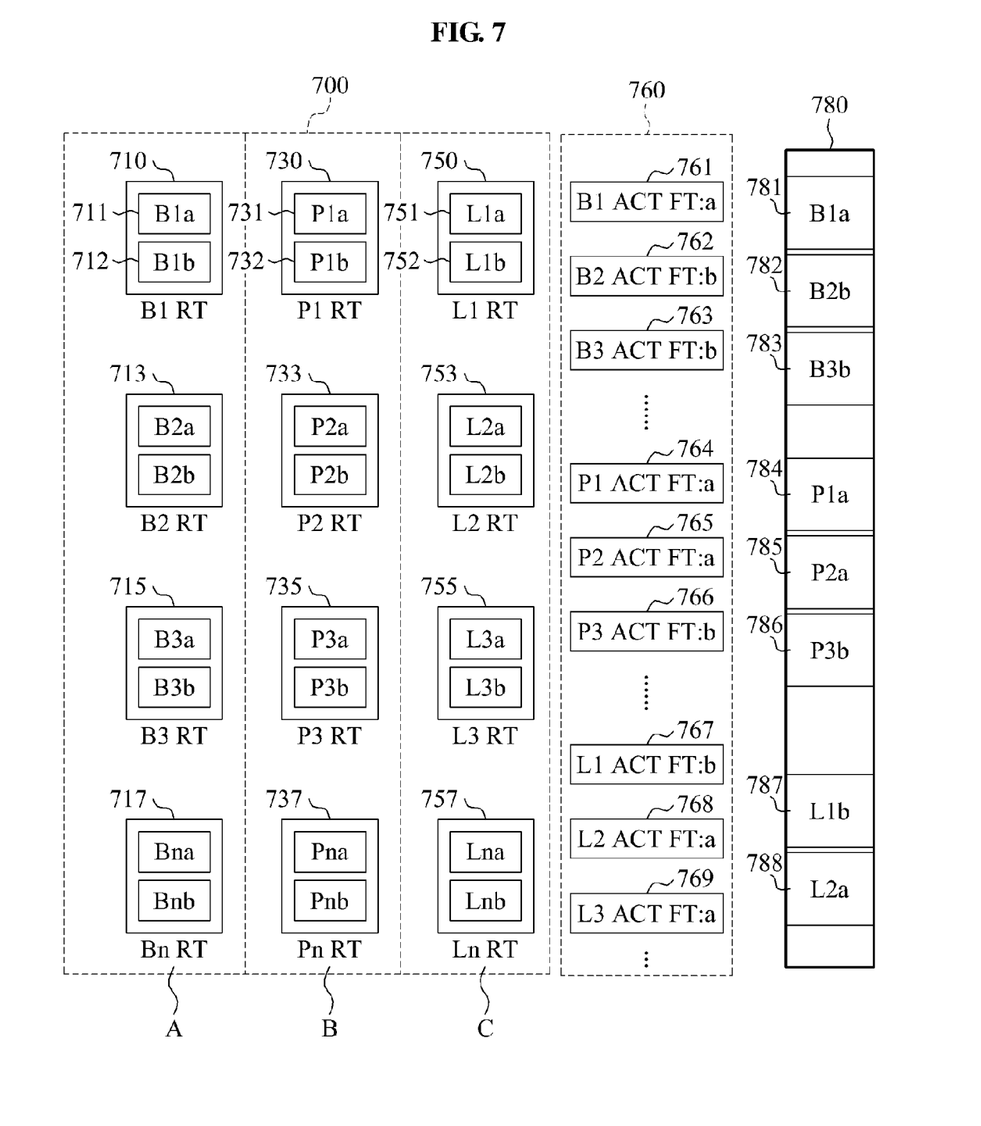
FIG. 7 illustrates an example of changing a path using an active transmission table classified for each event in a data processing engine memory according to an embodiment.

FIG. 7 illustrates an example of changing a path using an active transmission table classified for each event in a data processing engine memory 700 according to an embodiment.

Referring to FIG. 7, active transmission tables are classified for the respective events requiring change of a data path.

The data processing engine memory 700 may include a block table area A including block areas 710, 713, 715, and 717, a port table area B including block areas 730, 733, 735, and 737, and a logical path group table area C including block areas 750, 753, 755, and 757, corresponding to the respective events occurring in line matching blocks, data ports, and logical path groups.

The data processing engine memory 700 may include the block table area A that may correspond to large scale path change in response to an occurrence of an event requiring change of a data path in line matching blocks. Block preliminary transmission tables 711 and 712 corresponding to the event may be defined in the block table area A.

The data processing engine memory 700 may include the port table area B that may correspond to large scale path change in response to an occurrence of an event requiring change of a data path in data ports. Port preliminary transmission tables 731 and 732, corresponding to the event may be defined in the port table area B.

Also, the data processing engine memory 700 may include the logical path group table area C that may correspond to large scale path change in response to an occurrence of an event requiring change of a data path in predetermined logical paths. Logical path group preliminary transmission tables 751 and 752 corresponding to the event may be defined in the logical path group table area C.

A transmission table designator area 760 may include block transmission table designators 761, 762, and 763, port transmission table designators 764, 765, and 766, and logical path group transmission table designators 767, 768, and 769.

The block transmission table designators 761, 762, and 763 may designate the block preliminary transmission tables 711 and 712 to be used for block areas 781, 782, and 783 of an active transmission table 780.

The port transmission table designators 764, 765, and 766 may designate the port preliminary transmission tables 731 and 732 to be used for port areas 784, 785, and 786 of the active transmission table 780.

The logical path group transmission table designators 767, 768, and 769 may designate the logical path group preliminary transmission tables 751 and 752 to be used for logical group areas 787 and 788 of the active transmission table 780.

Inside of the active transmission table 780 may be classified to correspond to the respective events occurring in line matching blocks, data ports, and logical path groups.

In response to an occurrence of an event requiring change of a transmission table, an area, for example, the block areas 781, 782, and 783, the port areas 784, 785, and 786, and the logical group areas 787 and 788, of the active transmission table 780 corresponding to the event may be changed with a substitute table, for example, the block preliminary transmission tables 711 and 712, the port preliminary transmission tables 731 and 732, and the logical path group preliminary transmission tables 751 and 752, of a preliminary transmission table.

Figure 8:
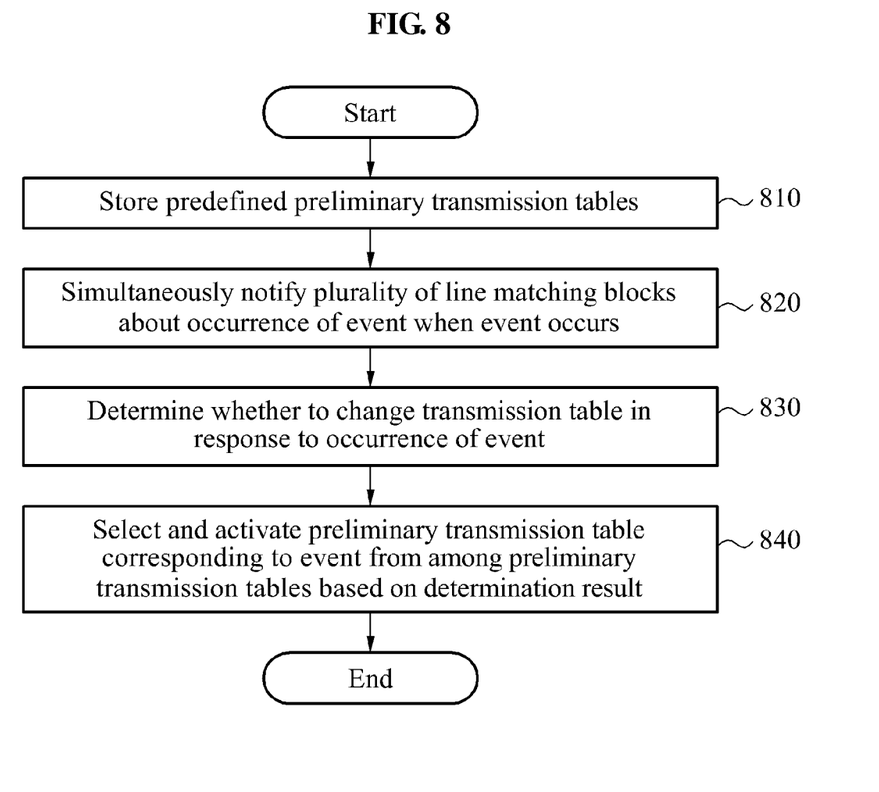
FIG. 8 is a flowchart illustrating an operating method of a data processing system according to an embodiment.

FIG. 8 is a flowchart illustrating an operating method of a data processing system according to an embodiment.

Referring to FIG. 8, in operation 810, the data processing system may store predefined preliminary transmission tables corresponding to the respective events requiring change of a data path. The preliminary transmission tables may include destination information on all the physical or logical paths.

In operation 820, when the event occurs, the data processing system may simultaneously notify a plurality of line matching blocks about the occurrence of the event through an internal communication device.

Here, the data processing system may receive a message transmitted and received between the line matching blocks through a bus matching port, may interpret the received message, and may recognize the event, that is, the occurrence of the event.

In operation 830, the data processing system may determine whether to change a transmission table in response to the occurrence of the event.

In operation 840, the data processing system may select and activate a preliminary transmission table corresponding to the event from among the preliminary transmission tables based on the determination result. A preliminary transmission table designated by a transmission table designator may be used as an active transmission table for a data processing engine.

In operation 840, the data processing system may use the selected preliminary transmission table as the active transmission table by duplicating content of the selected preliminary transmission table at a location of the active transmission table.

In addition, the data processing system may find an output data port corresponding to an input path of input data coming through a data port by referring to the preliminary transmission tables.

The above-described embodiments of the present invention may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM disks and DVDs; magneto-optical media to such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention, or vice versa.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. A data processing system, comprising:
a plurality of line matching blocks each comprising a data processor configured to:
store predefined preliminary transmission tables corresponding to respective events requiring change of a data path, wherein the preliminary transmission tables comprise destination information on all physical or logical paths,
simultaneously notify at least a portion of the line matching blocks about an occurrence of an event through an internal communication device in response to the occurrence of the event,
determine whether to change a transmission table in response to the occurrence of the event, and
select and activate a preliminary transmission table corresponding to the event from among the preliminary transmission tables based on the determination result; and
a shared bus configured to enable information on an event requiring change of a data path to be transmitted and received between the plurality of line matching blocks,
wherein the data processor is further configured to use the selected preliminary transmission table as the active transmission table by changing a base address of the active transmission table with a base address of the selected preliminary transmission table.

2. The data processing system of claim 1, wherein the data processor is configured to verify the occurrence of the event by collecting state information of the line matching blocks.

3. The data processing system of claim 1, wherein the data processor comprises:
a bus controller configured to create a message comprising the occurrence of the event in response to the occurrence of the event, and to transfer the message to remaining line matching blocks excluding a line matching block in which the event has occurred, through the shared bus;
a bus matching port configured to convert a transmission or reception message of the bus controller to a physical message format of the shared bus;
a data processing engine memory configured to store the preliminary transmission tables that are defined for the respective events; and
a data processing engine structure configured to find an output data port corresponding to an input path of input data coming through a data port by referring to the preliminary transmission tables stored in the data processing engine memory.

4. The data processing system of claim 3, wherein when the message is received, the bus controller is configured to interpret the message, to determine whether to change the transmission table, and to use the selected preliminary transmission table as an active transmission table based on the determining whether to change the transmission table result.

5. The data processing system of claim 4, wherein the bus controller is configured to use the selected preliminary transmission table as the active transmission table by locating the active transmission table on a virtual space, and by mapping a physical address of the selected preliminary transmission table at a location of the active transmission table on the virtual space.

6. The data processing system of claim 3, further comprising:
a bus controller memory configured to store the predefined preliminary transmission tables, wherein the bus controller comprises: a transmission table designator configured to designate an identifier (ID) of a preliminary transmission table corresponding to the event; and
a path change interpreter structure configured to interpret a message transmitted and received between the line matching blocks through the bus matching port, to recognize the event requiring change of the data path, and to input, to the transmission table designator, the ID of the preliminary transmission table corresponding to the event.

7. The data processing system of claim 6, wherein the preliminary transmission table selected by the transmission table designator is used as an active transmission table for the data processing engine structure.

8. The data processing system of claim 6,
wherein the bus controller comprises a path change interpreter structure configured to interpret a message transmitted and received between the line matching blocks through the bus matching port, to recognize the event requiring change of the data path, and to input, to the transmission table designator, an ID of the preliminary transmission table corresponding to the event, and
wherein the data processing engine structure comprises:
a transmission table designator structure configured to designate the ID of the preliminary transmission table corresponding to the event; and
a data processing engine memory configured to store the predefined preliminary transmission tables.

9. The data processing system of claim 1, wherein the event requiring change of the data path occurs in at least one of data ports in which a plurality of physical paths or a plurality of logical paths is comprised, the line matching blocks, and logical path groups.

10. The data processing system of claim 1, further comprising: a system control block comprising a system controller configured to verify an occurrence of the event by collecting state information of the line matching blocks, and to notify at least a portion of the line matching blocks about the occurrence of the event through the internal communication device in response to the occurrence of the event.

11. The data processing system of claim 10, wherein the system controller comprises:
a bus controller configured to create a message comprising the occurrence of the event in response to the occurrence of the event, and to transfer the message to remaining line matching blocks excluding at least a portion of the line matching blocks through the shared bus; and
a bus matching port configured to convert a transmission or reception message of the bus controller to a physical message format of the shared bus.

12. The data processing system of claim 1, wherein the shared bus comprises at least one of a data path configured as a data switch for relaying exchange of user data between the line matching blocks and a switch port and a control path for messaging between processors.

13. The data processing system of claim 1, wherein a bus controller and a bus matching port comprised in each of the line matching blocks operate as a bus node of the shared bus, and the shared bus is provided in a multi-bus structure in which a master bus node at which a predetermined block, among the line matching blocks, performs a master function is present for each line matching block and a master bus node collectively transfers a common message to slave bus nodes or a predetermined group.

14. An operating method of a data processing system, the method comprising:
storing predefined preliminary transmission tables corresponding to respective events requiring change of a data path, wherein the preliminary transmission tables comprise destination information on all physical or logical paths;
simultaneously notifying a plurality of line matching blocks about an occurrence of an event through an internal communication device in response to the occurrence of the event;
determining whether to change a transmission table in response to the occurrence of the event; and
selecting and activating a preliminary transmission table corresponding to the event from among the preliminary transmission tables based on the determination result,
wherein the selecting and the activating comprises duplicating content of a preliminary transmission table selected from among the preliminary transmission tables at a location of an active transmission table.

15. The method of claim 14, further comprising: finding an output data port corresponding to an input path of input data coming through a data port by referring to the preliminary transmission tables.

16. The method of claim 14, further comprising: recognizing the event by interpreting a message transmitted and received between the line matching blocks through a bus matching port.

17. The method of claim 14, wherein the selecting and the activating comprises inputting, to a transmission table designator, an identifier (ID) of the preliminary transmission table corresponding to the event.

* * * * *